United States Patent

Gebele et al.

[11] Patent Number: 5,228,838
[45] Date of Patent: Jul. 20, 1993

[54] METHOD FOR THE EVACUATION OF A LOW-VACUUM CHAMBER AND OF A HGH-VACUUM CHAMBER, AS WELL AS A HIGH-VACUUM APPARATUS FOR THE PRACTICE THEREOF

[75] Inventors: Thomas Gebele, Freigericht; Wolfgang Buschbeck, Hanau, both of Fed. Rep. of Germany

[73] Assignee: Leybold Aktiengesellschaft, Hanau, Fed. Rep. of Germany

[21] Appl. No.: 936,035

[22] Filed: Aug. 26, 1992

[30] Foreign Application Priority Data

Apr. 27, 1992 [DE]   Fed. Rep. of Germany ....... 4213763

[51] Int. Cl.$^5$ .......................... B01J 3/04; G01L 21/00
[52] U.S. Cl. ....................................... 417/53; 417/62; 417/250
[58] Field of Search ................... 417/53, 62, 250, 201, 417/205

[56] References Cited

U.S. PATENT DOCUMENTS 3,536,418 10/1970 Breaux .............................. 417/201 X
3,668,393 6/1972 Von Rauch .................... 417/201 X
4,850,806 7/1989 Morgan ............................. 417/62 X
5,114,316 5/1992 Shimizu ................................ 417/53

FOREIGN PATENT DOCUMENTS 9007061 6/1990 World Int. Prop. O. ............ 417/62

OTHER PUBLICATIONS

Pirani et al., *Principles of Vacuum Engineering* Chapman & Hall (1961) pp. 2-3, 386-406.

Primary Examiner—Richard E. Gluck
Attorney, Agent, or Firm—Felfe & Lynch

[57] ABSTRACT

For the evacuation of a low-vacuum chamber (4) and of a high-vacuum chamber (5), two pump trains (6, 7) are provided, each consisting of a vacuum pump unit (8, 9) and a forepump unit (10, 11). The forepump unit (11) of the pump train (7) of the high-vacuum chamber (5) can draw selectively from the vacuum pump unit (9) of the high-vacuum chamber (5) or from a high-vacuum pump unit (12) connected likewise to the high-vacuum chamber (5). The vacuum pump unit (9) can aspirate either from the highvacuum chamber (5) or from the low-vacuum chamber (4) and discharge to the forepump unit (10) of pump train (6) or to the forepump unit (11) of pump train (7).

4 Claims, 2 Drawing Sheets

METHOD FOR THE EVACUATION OF A LOW-VACUUM CHAMBER AND OF A HGH-VACUUM CHAMBER, AS WELL AS A HIGH-VACUUM APPARATUS FOR THE PRACTICE THEREOF

BACKGROUND OF THE INVENTION

The invention relates to a method for evacuating a low-vacuum chamber and a high-vacuum chamber of a high-vacuum apparatus, in which first the low-vacuum chamber and the high-vacuum chamber are evacuated together by means of pump trains each containing a vacuum pump unit and a vacuum forepump unit. The pump train of the high-vacuum chamber is used as a forepump for a high-vacuum pump unit of the high-vacuum chamber when the vacuum falls below a preset level. Furthermore, the invention relates to a high-vacuum apparatus for the practice of such a method.

In vacuum technology it is often necessary to evacuate two or more chambers in a vacuum apparatus to different working pressures. In vacuum depositing apparatus for coating substrates in band form, a pressure of less than $5 \times 10^{-4}$ mbar must prevail, for example, in the chamber in which the vapor depositing process takes place, while in the winding chamber in which the substrate is wound and unwound a pressure of $5 \times 10^{-2}$ mbar suffices.

To produce the necessary vacuums in such an apparatus, it has up to now been the practice to associate one pump train with the low-vacuum chamber configured as the winding chamber and another with the one serving as the coating chamber. When the changeover pressure is reached, the pump train of the high-vacuum chamber is cut off from the latter by means of a valve and used as the forepump for a high-vacuum pump unit then to be connected to the high-vacuum chamber. To assure a rapid draw-down and reliable operation of the high-vacuum pump unit, it is necessary to select the lowest possible changeover pressure. Especially in the case of dirty production apparatus this requires the pump train of the high-vacuum chamber to have a very great suction capacity in the pressure range between 1000 to 1 mbar. As soon as the pump train, however, is operating only as a forepump for the high-vacuum unit, and since then a preliminary vacuum pressure of $1 \times 10^{-1}$ to $3 \times 10^{-1}$ mbar is sufficient, all that is needed is only about one-tenth of the previously needed suction capacity. Therefore the pump train of the high-vacuum chamber is oversized for a far greater proportion of the time involved in the pumping cycle.

SUMMARY OF THE INVENTION

The invention is addressed to the problem of developing a method for the evacuation of a low-vacuum chamber and of a high-vacuum chamber which will be capable of reaching a very low pressure very rapidly with pump trains of the smallest possible size. Furthermore, a high-vacuum apparatus using this method is to be created.

The first-mentioned problem is solved in accordance with the invention by the fact that, when pressure drops below the train vacuum in the low-vacuum chamber and high-vacuum chamber, the vacuum pump unit of the pump train of the high-vacuum chamber is connected at the discharge end to the suction of the forepump unit of the vacuum-chamber pump train and the suction end of the preliminary vacuum pump unit originally associated with it is connected to the discharge of the high-vacuum pump unit.

With this procedure, it is no longer necessary for one of the two pump trains to be oversize during the longest period of its operation. All pump units therefore deliver a uniformly high power, so that they do not need to be sized only for briefly occurring power requirements and consequently to be undesirably expensive. The vacuum pump unit of the pump train of the high-vacuum chamber is used at the beginning of the draw-down procedure for the removal of gas from the high-vacuum chamber in conjunction with the forepump unit following it, and then is used to assist the high-vacuum pump unit in the high pressure range ($1 \times 10^{-2}$ to $5 \times 10^{-2}$ mbar).

The variable rotary piston pumping stage formed by the two pump trains must, in accordance with the invention, perform the following tasks:

1. Pump atmosphere out of the low-vacuum chamber and high-vacuum chamber.,
2. Sustain an operating pressure in the low-vacuum chamber during the vapor depositing,
3. Sustain the forepump pressure for the high-vacuum pump unit,
4. Strengthen the high-vacuum pump unit in a pressure range from, for example, $1 \times 10^{-2}$ to $5 \times 10^{-2}$ mbar.

Since these requirements do not occur all simultaneously within a pump-down sequence, it becomes possible by means of valves and lines to connect individual units of the variable rotary piston pump stand alternately to parts of the apparatus such that, in any state of operation, a maximum of pumping power can be achieved with a minimum of pumps and valves. Furthermore, the number of different types of pumps can be minimized.

It is advantageous if during the process the vacuum pump unit of the high-vacuum chamber's pump train will be connected only to the low-vacuum chamber.

In this manner the power of the aspiration of gas from the low-vacuum chamber can be doubled during the process, which is advantageous especially because the low-vacuum chamber usually has a substantially greater yield of gas than the high-vacuum chamber. The vacuum pump unit would no longer be of any use during the process as a pump of the high-vacuum chamber, since it cannot operate in the required high-vacuum range and is not needed as a forepump for the high-vacuum pump unit.

The second problem, namely the creation of a high-vacuum apparatus operating according to the method of the invention, is solved by the invention in that the preliminary vacuum pumping unit can be connected selectively with the outlet of a vacuum pump unit of the pump train of the high-vacuum chamber or of the high-vacuum pump unit, and that the outlet of the vacuum pump unit of the pump train of the high-vacuum chamber is connected through a cross connection with the inlet of the preliminary vacuum pumping unit of the pump train of the low-vacuum chamber.

In a high-vacuum apparatus of this kind, the vacuum pump unit of the high-vacuum chamber pump train can be used first at a still-high pressure for drawing down the high-vacuum chamber and then for assisting the high-vacuum pump unit, to relieve it of load, and the vacuum pump unit preceding it, which serves as a forepump for the high-vacuum pump unit at pressures below $1 \times 10^{-2}$ mbar, does not have to be oversized.

It is advantageous also if one pump train is connected only to the low-vacuum chamber and the other pump train is connected to the low-vacuum chamber and to the high-vacuum chamber with the interposition of a shut-off valve in each case. In this manner it becomes possible with the forepump unit to draw first from the low-vacuum chamber and from the high-vacuum chamber, and then use it to draw only from the high-vacuum chamber, and during the process to aspirate from the low-vacuum chamber together with the vacuum pump unit of the pump train of this low-vacuum chamber. This embodiment is advantageous mainly because during the process a very high suction capacity is needed in the pressure range of $1 \times 10^{-2}$ mbar at the low-vacuum chamber, and then the use of this vacuum pump unit on the high-vacuum chamber makes no sense since it cannot operate in the required pressure range of less than $5 \times 10^{-4}$ mbar.

DETAILED DESCRIPTION OF THE PREFERRED EMBODIMENT

Figure 1:
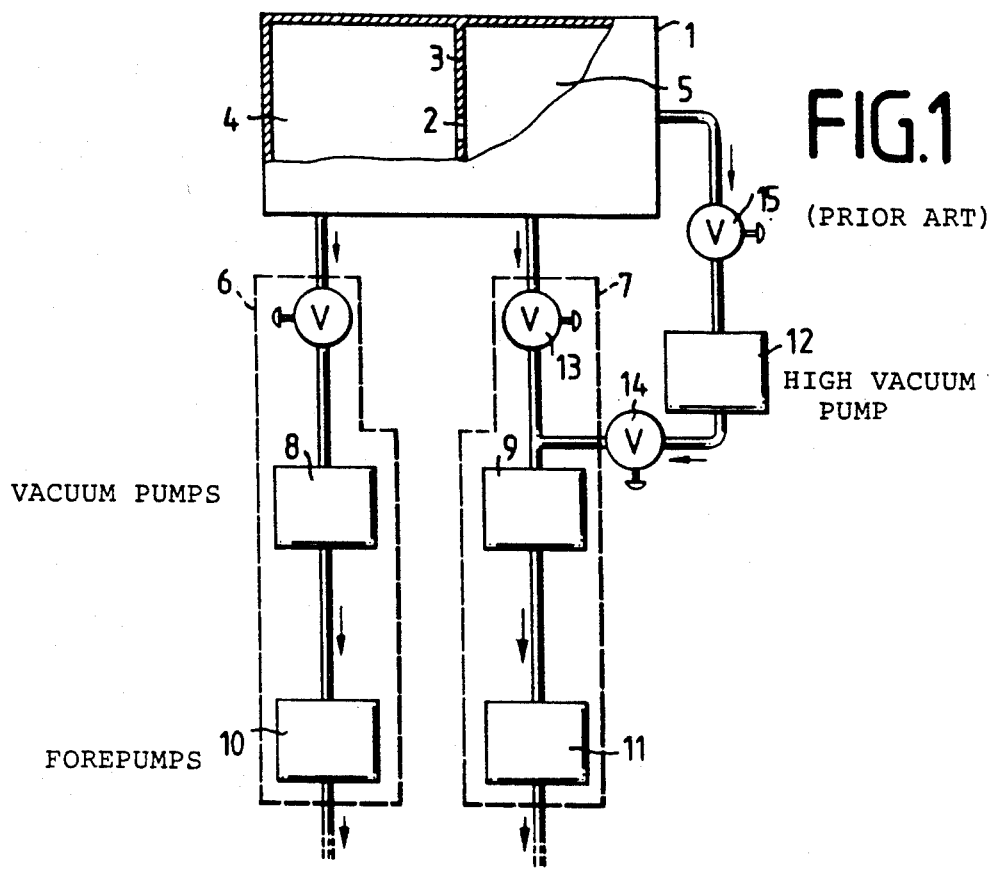
FIG. 1 is a schematic of a prior art high-vacuum apparatus.

A prior art high-vacuum apparatus is represented in FIG. 1. It has a tank 1 which is divided into a low-vacuum chamber 4 and a high-vacuum chamber 5 by a partition wall 3 containing a gap 2. If the high-vacuum apparatus is a vapor depositing apparatus for films, then the high-vacuum chamber 5 is configured as a coating chamber and has the evaporator required for that purpose, while the low-vacuum chamber 3 is a winding chamber from which the film to be coated travels out of it through the gap 2 into the high-vacuum chamber 5 and back into it again.

Two pump trains 6 and 7 serve for the evacuation of the low-vacuum chamber 4 and of the high-vacuum chamber 5, each having a vacuum pump unit 8, 9, and a forepump pump unit 10, 11. In addition, a high-vacuum pump unit 12 is connected to the high-vacuum chamber 5. At the start of the vacuum creating process only pump trains 6 and 7 operate. When a predetermined changeover pressure is reached, a shut-off valve 13 disposed in the pump train 7 is closed and a shut-off valve 14 is opened. After an additional valve 15 is opened, the high-vacuum pump unit 12 is then able to pump gas out of the high-vacuum chamber 5 to the system of vacuum pump unit 9 and forepump unit 11 that operates as a forepump.

Figure 2:
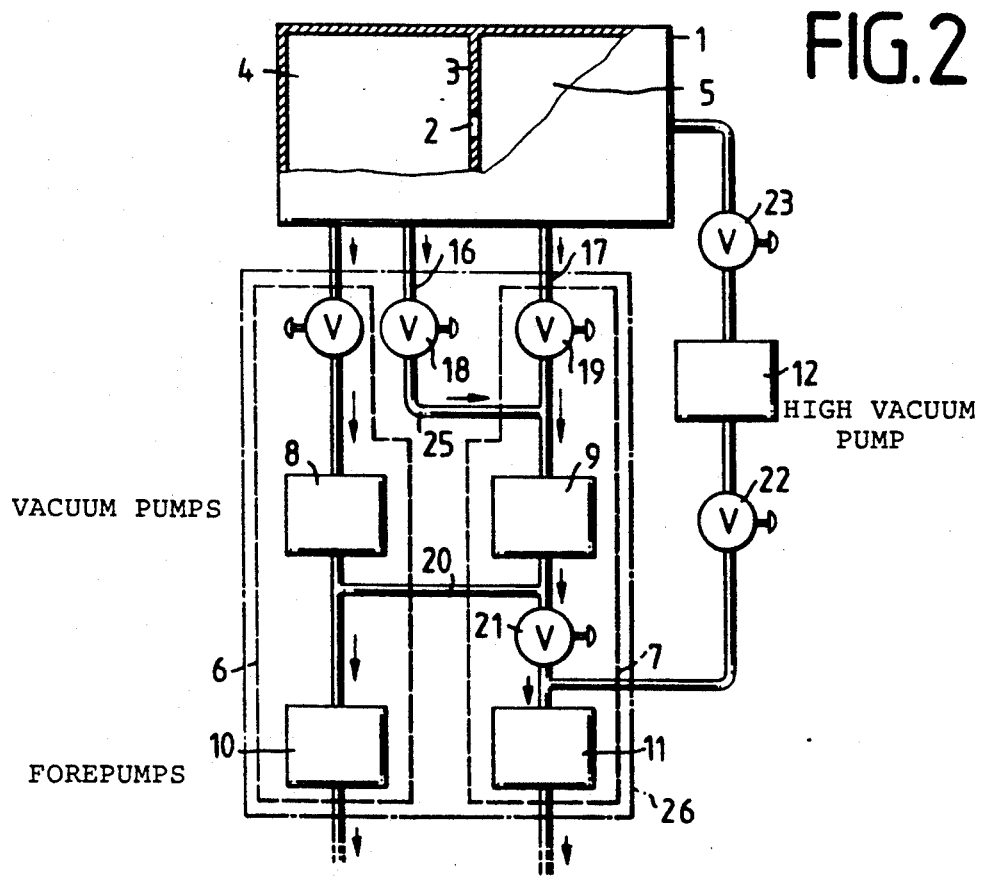
FIG. 2 is a schematic of a high-vacuum apparatus according to the invention at the beginning of the draw-down.

FIG. 2 shows a high-vacuum apparatus according to the invention. Like the apparatus described above, it has a tank 1 with a low-vacuum chamber 4 and a high-vacuum chamber 5. The pump trains 6 and 7 are again divided each into a vacuum pump unit 8 and 9 and a forepump unit 10 and 11. Furthermore, the pump unit 9 is able to aspirate from the low-vacuum chamber 4 and/or from the high-vacuum chamber 5 through lines 16 and 17 each containing a valve 18 and 19.

Between the vacuum pump units 8 and 9 and the forepump units 10 and 11 there is a cross connection 20. The vacuum pump units 8 and 9 are therefore permanently connected at their output end at least to the forepump unit 10. By closing a valve 21 the forepump unit 11 can be cut off from the vacuum pump units 8 and 9. The forepump unit 11 can then, after two valves 22 and 23 are opened, operate as a forepump for the high-vacuum pump unit 12. Due to the arrangement according to the invention, the pump trains 6 and 7 together form a variable rotary piston pump set 26.

The arrows in FIG. 2 indicate the beginning of the draw-down process. The pump train 6 pumps down the low-vacuum chamber 4, and the pump train 7 pumps atmospheric gas out of the low-vacuum chamber 4 and high-vacuum chamber 5. The connection through the high-vacuum pump unit 12 is shut off. The low-vacuum chamber 4 and high-vacuum chamber 5 and the two pump trains 6 and 7 are connected together by means of the valves 18 and 19, a connecting line 25 and the cross connection 20. Thus the high-vacuum chamber 5 and the low-vacuum chamber 4 are evacuated uniformly.

Figure 3:
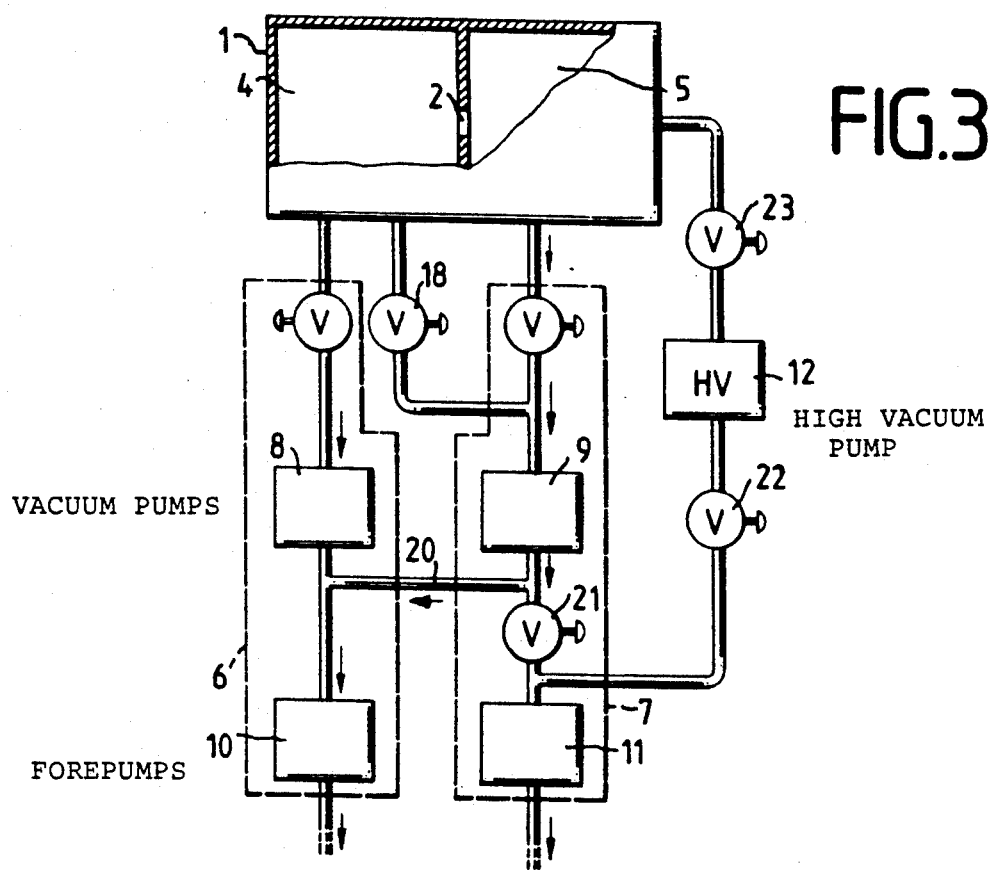
FIG. 3 is a schematic of the high-vacuum apparatus after reaching a first vacuum stage, FIG. 4 the high-vacuum apparatus during the process.

In FIG. 3, arrows indicate a state of operation that occurs at about 2 millibars. The valves 18 and 21 are closed, while a valve 22 is opened. The vacuum pump unit 9 then is drawing only from the high-vacuum chamber 5. The outputs of the vacuum pump units 8 and 9, connected together by the cross connection 20, are now being pumped away only by the forepump unit 10. At the same time the high-vacuum pump unit 12 is being exhausted by the forepump unit 11.

When the vacuum drops below about $4 \times 10^{-2}$ mbar, valve 23 opens. The high-vacuum chamber 5 is now being pumped down by the vacuum pump unit 9 and the high-vacuum pump unit 12 with the forepump unit 11 preceding it. In this state of operation, which is not represented, the high-vacuum pump unit 12 is in a pressure range in which it still cannot operate in an optimum manner. It is therefore assisted by the vacuum pump unit 9 of the variable rotary piston pump set 26.

Figure 4:
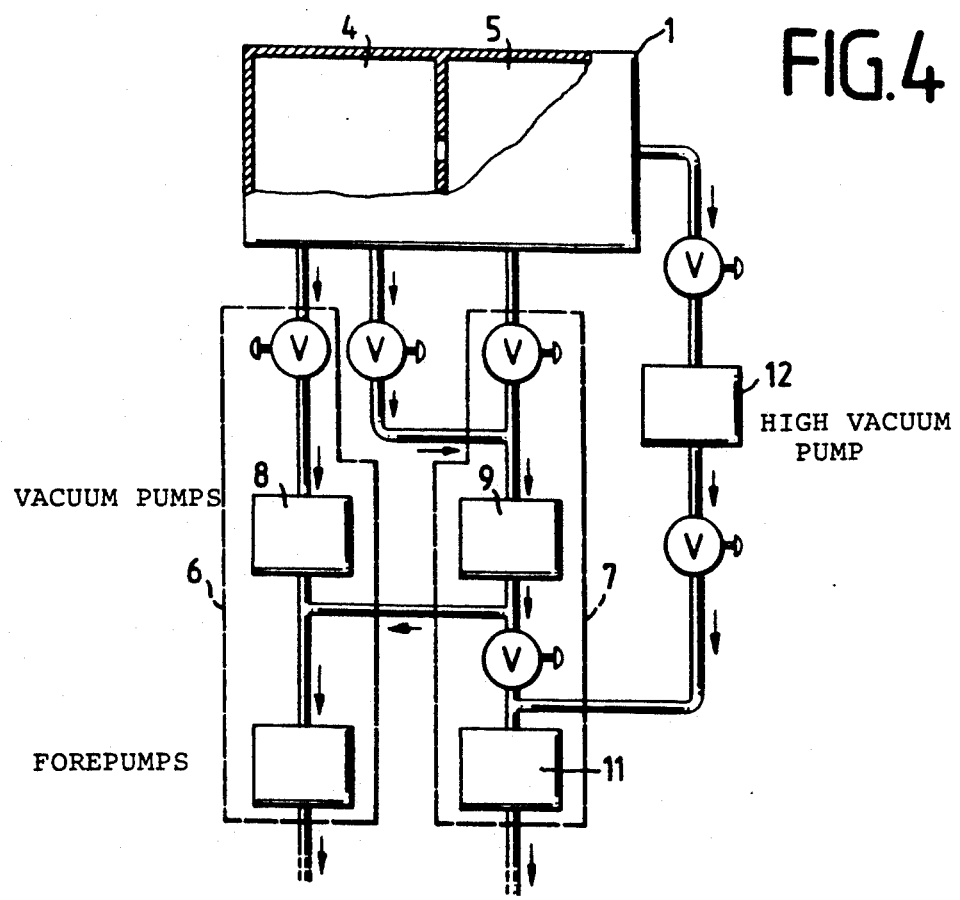

FIG. 4 shows the conditions in the course of the process. It can be seen that the vacuum pump units 8 and 9 are now both connected exclusively to the low-vacuum chamber 4. Gas is aspirated from the high-vacuum chamber 5 by the high-vacuum pump unit 12 and the forepump unit 11.

We claim:

1. Method for evacuating a vacuum apparatus having a low vacuum chamber, a pump train for the low vacuum chamber, a high vacuum chamber, a high vacuum pump for the high vacuum chamber, and a pump train for the high vacuum chamber, each pump train having a vacuum pump unit with a suction and a discharge and a forepump unit with a suction and a discharge, said high vacuum pump unit having a suction and a discharge, said method comprising evacuating said low vacuum chamber and said high vacuum chamber by their respective pump trains until a first predetermined pressure is reached, connecting the discharge of the vacuum pump unit for the high vacuum chamber only to the suction for the forepump for the low vacuum chamber when said first predetermined pressure is reached, and connecting the suction of the forepump unit for the high vacuum chamber to the discharge of the high vacuum pump for the high vacuum chamber.

2. Method according t claim, 1, wherein after a second predetermined pressure which is lower than said first predetermined pressure is reached, the suction of the vacuum pump unit of the pump train of the high-vacuum chamber is connected only to the low-vacuum chamber.

3. Vacuum apparatus of the type comprising a low vacuum chamber, a pump train for the low vacuum chamber, a high vacuum chamber, and a pump train for the high vacuum chamber, each pump train having a vacuum pump unit with a suction and a discharge and a forepump unit with a suction and a discharge, said apparatus further comprising a high vacuum pump unit for the high vacuum chamber, said high vacuum pump unit having a suction and a discharge, said apparatus further comprising means for selectively connecting the suction of the forepump unit of the pump train for the high vacuum chamber to the discharge of the vacuum pump unit of the pump train of the high vacuum chamber and to the discharge of the high vacuum pump unit, and means connected the discharge of the vacuum pump unit of the pump train of the high vacuum chamber to the suction of the forepump unit of the pump train for the low vacuum chamber.

4. Vacuum apparatus as in claim 3 wherein the suction of the vacuum pump unit of the pump train for the low vacuum chamber is connected exclusively to the low vacuum chamber, and the suction of the vacuum pump unit of the pump train for the high vacuum chamber is selectively connected to the low vacuum chamber and the high vacuum chamber.

* * * * *